(12) United States Patent
Coronado

(10) Patent No.: US 6,319,585 B1
(45) Date of Patent: Nov. 20, 2001

(54) CURVED VENEER LAMINATED STOCK AND METHOD OF MANUFACTURE

(75) Inventor: Hector M. Coronado, Los Angeles, CA (US)

(73) Assignee: Bentec, Inc., Compton, CA (US)

( * ) Notice: Subject to any disclaimer, the term of this patent is extended or adjusted under 35 U.S.C. 154(b) by 0 days.

(21) Appl. No.: 09/359,602

(22) Filed: Jul. 23, 1999

(51) Int. Cl.$^7$ ................ B31F 1/00; B29C 47/00
(52) U.S. Cl. ............ 428/106; 428/78; 428/537.1; 428/541; 297/284.1; 297/452.21; 297/452.24; 156/221; 156/228; 144/381
(58) Field of Search ................ 428/78, 77, 106, 428/1.7, 114, 174, 541, 537.1; 297/198, 284.1, 452.11, 452.22, 452.65, 452.24; 144/209.1, 215.5, 259, 381; 156/221, 222, 228, 245, 292

(56) References Cited

U.S. PATENT DOCUMENTS

| | | |
|---|---|---|
| 416,808 | 12/1889 | Schnabel . |
| 2,207,939 * | 7/1940 | Nordby ................ 144/309 |
| 3,197,255 | 7/1965 | Caudill . |
| 3,501,197 | 3/1970 | Burton . |
| 3,720,441 | 3/1973 | Corchran . |
| 3,878,015 | 4/1975 | Johnston . |
| 4,543,284 * | 9/1985 | Baum ................ 428/106 |
| 4,551,024 | 11/1985 | Clapp . |
| 5,288,131 | 2/1994 | Singley . |
| 5,637,371 | 6/1997 | Tominaga et al. . |
| 5,664,835 | 9/1997 | Desanta . |
| 5,740,997 | 4/1998 | Van Wieran . |
| 5,791,734 | 8/1998 | Malenotti . |
| 5,879,489 * | 3/1999 | Burns et al. ............ 156/64 |

\* cited by examiner

Primary Examiner—Donald J. Loney
(74) Attorney, Agent, or Firm—Shook, Hardy & Bacon L.L.P.

(57) ABSTRACT

A chair stock such as a seat 12 includes a construction in which uppermost and lowermost wood veneer sheets 30, 32 present opposing support and mounting surfaces 20, 22, and are spaced from one another by an intermediate element 34 such as a pile of relatively small wood veneer sheets 36. The intermediate element 34 presents a bearing surface that corresponds in size to a planer central region 28 of the mounting surface 22, and the support surface 20 includes a curved central region directly opposite the planer central region. The stock is constructed by forming a pile of the sheets 30, 32 and the intermediate element 34, and pressing the pile between a pair of spaced apart pressing surfaces. One of the pressing surfaces includes a substantially planer central region aligned with and corresponding in size to the bearing surface of the intermediate element, and the other pressing surface includes a curved central region immediately opposite the planer central region.

15 Claims, 2 Drawing Sheets

CURVED VENEER LAMINATED STOCK AND METHOD OF MANUFACTURE

CROSS-REFERENCE TO RELATED APPLICATIONS

"Not Applicable".

STATEMENT REGARDING FEDERALLY SPONSORED RESEARCH OR DEVELOPMENT

"Not Applicable".

BACKGROUND OF THE INVENTION

The present invention relates generally to curved veneer laminated stock for use in various chair components such as seats, backrests, and armrests. More particularly, the invention relates to veneer stock presenting opposed surfaces, wherein one of the surfaces is curved to suit the primary function of the stock and the opposite surface presents a substantially planer central region that facilitates attachment of the stock to the support structure of the chair.

It is known to construct veneer stock, such as a chair seat, backrest or armrest, by pressing a pile of wood veneer sheets into a desired shape while an adhesive applied between the sheets is allowed to set, fixing the shape of the seat, backrest or armrest. By employing a plywood construction of this type, manufacturers are able to produce a number of different shapes of stock that satisfy the ergonomic and/or design requirements for the stock. For example, in the construction of a plywood seat, the wood veneer sheets are pressed into a profiled shape presenting a curved or saddle shaped upper support surface that comfortably accommodates the seat of a user. Likewise, if the stock is a backrest, the sheets are pressed into a profiled shape presenting a curved support surface that supports a user's back when the user is seated in the chair.

One aspect of the conventional construction is that known stock not only presents a profiled support surface adapted to support the user, but also an opposing mounting surface that is profiled in the same shape as the support surface. Thus, in the construction of a seat, the lower mounting surface of the seat presents a profiled shape that corresponds to the shape of the upper support surface. As a result, numerous problems are encountered. For example, when the conventional construction is assembled on a chair, the bottom or mounting surface is placed against and secured to the support or control mechanism. However, because the surface is not planer, it does not mate flush with the control mechanism, and the fasteners used to secure the seat in place are placed under moment and shear forces that can cause premature failure of the fasteners.

A related problem resides in the failure that can occur in the seat itself due to the non-linear forces exerted on the seat and fasteners due to the non-mating fit between the mounting surface of the seat and the control mechanism. Such mechanical stresses can cause delamination of the wood veneer sheets, cracking of the veneer, deformation, and/or other failure that might require replacement of the seat or chair. By placing spacers between a seat, backrest or armrest and the support structure to which it is affixed, it is possible to alleviate these stresses to some degree, and to reduce rocking of the component. However, the use of such spacers introduces different problems that must be addressed. For example, spacers concentrate the load of the seat on a relatively small area of the support mechanism, increasing the likelihood of failure, and are time consuming to assemble.

BRIEF SUMMARY OF THE INVENTION

It is an object of the present invention to solve the technical problems left unaddressed by the prior art, and to provide a stock construction that presents a support surface adapted to provide support to a user in the chair, and an opposed mounting surface adapted to fit flush against a support component of the chair.

In accordance with these and other objects evident from the following description of a preferred embodiment of the invention, a chair stock such as a seat, backrest or armrest is provided which includes lower and upper sheets arranged in a pile presenting opposed mounting and support surfaces, and an intermediate element interposed between the sheets. The intermediate element includes a planer bearing surface that is smaller than the mounting and support surfaces, and the mounting surface includes a substantially planer central region aligned with the bearing surface to facilitate mounting of the stock on a chair control mechanism, backrest bracket, armrest bracket or the like.

By providing a construction in accordance with the present invention, numerous advantages are realized. For example, by providing a veneer stock having an intermediate element interposed between first and second outer sheets, it is possible to provide the stock with opposed support and mounting surfaces that do not correspond with one another in shape, but that each present a profile best suited to the function to be performed by that surface. Specifically, the stock can be formed with a mounting surface presenting a planer central region at which the stock can be secured to a mounting component of the chair, and an opposing support surface presenting a curved central region adapted to support the seat, back or arms of a user.

BRIEF DESCRIPTION OF THE SEVERAL VIEWS OF THE DRAWING

The preferred embodiment of the present invention is described in detail below with reference to the attached drawing, wherein.

DETAILED DESCRIPTION OF THE INVENTION

Figure 1:
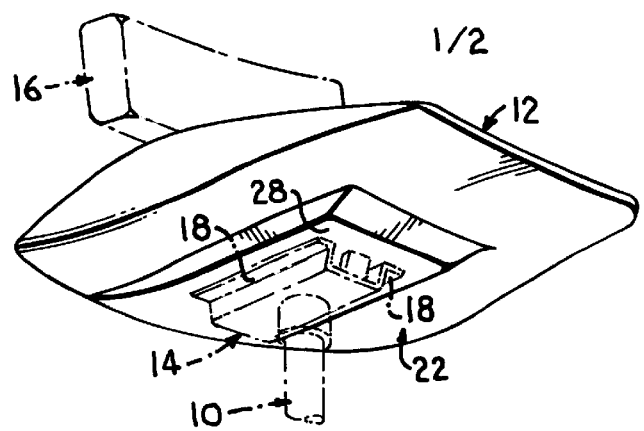
FIG. 1 is a perspective view of a chair including a seat constructed in accordance with the preferred embodiment of the present invention.

An office chair is illustrated in FIG. 1, and broadly includes a base 10, a curved veneer laminated seat 12 constructed in accordance with the preferred embodiment of the present invention, a control mechanism 14 for mounting the seat on the base, and a backrest 16. In the illustrated chair, the only component that is constructed of a curved veneer laminated stock in accordance with the preferred embodiment is the seat. However, it is to be understood that the illustrated chair is intended to be exemplary only, and that other components may be constructed in accordance with the present invention, such as backrests or armrests.

The base 10 of the chair can take any conventional form, typically including a plurality of legs on which feet or castors are mounted to support the base on the ground, and an upstanding column or height-adjustable cylinder on which the control mechanism is received. The particular construction of the base does not form a part of the present invention.

The control mechanism 14 can be a simple seat support bracket for securing the seat to the base, or it can be selected from any of a number of different types of mechanisms for supporting the seat for tilting, sliding and/or turning movement relative to the base. As illustrated in FIG. 1, the control mechanism includes a pair of laterally spaced, outwardly extending mounting flanges 18 presenting apertures, and conventional threaded fasteners are driven into the seat through the apertures to mount the seat on the mechanism. Alternately, the mechanism 14 may include a single mounting plate that extends across the top of the mechanism and presents holes for receipt of the fasteners.

The backrest 16 is illustrated as being constructed separate from the seat, but may be integral therewith. If separate, the backrest can either be supported on the chair by a backrest bracket forming a part of the chair control mechanism 14, or by a separate backrest bracket connected between the backrest and the seat or base. In either case, the backrest bracket presents mounting structure that engages the backrest and presents holes for receipt of threaded fasteners so that the backrest and bracket can be secured together.

Although not illustrated in the drawing, the chair can also include armrests on each side of the seat 12 forward of the backrest 16. The armrests are supported on the chair by armrest brackets that can be connected to the seat, the backrest, the control mechanism, or the base. In each instance, the armrest brackets present mounting structures that engages the armrests and present holes for receipt of threaded fasteners so that the armrests and brackets can be secured together.

Figure 2:
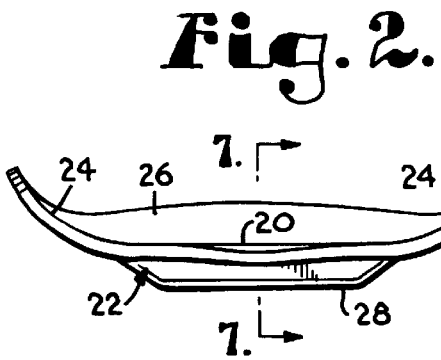
FIG. 2 is a front elevational view of the seat.

The seat 12 broadly includes an upper support surface 20, shown in FIG. 2, on which a person sits when using the chair, and an opposed lower mounting surface 22 by which the seat is secured to the control mechanism. The seat may also include side and/or back walls 24, 26 shaped to conform to the shape of a user's thighs and hips, if desired.

Figure 3:
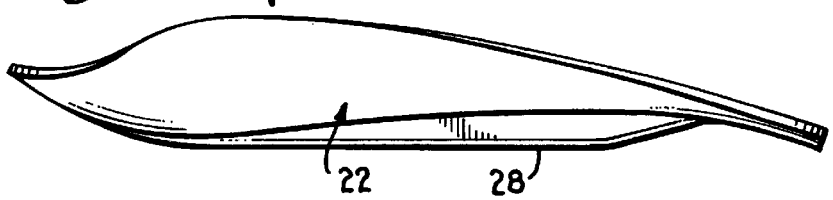
FIG. 3 is a side elevational view of the seat.

Returning to FIG. 1, the mounting surface 22 of the seat is generally curved to match the support surface 20, with the exception that a substantially planer central region 28 extends along the fore-to-aft central axis of the seat from a rear edge spaced slightly forward of the rear edge of the seat to a forward edge spaced rearward of the front edge of the seat, as shown in FIG. 3. The planer region 28 extends to each side of the fore-to-aft axis several inches, as illustrated in FIG. 1, to accommodate receipt of the control mechanism 14 so that the mounting surface and control mechanism bear flush against one another during mounting, obviating the need for spacers or the like. This arrangement allows threaded fasteners to be used to connect the seat to the mechanism without generating or being subject to moment or shear forces that might otherwise cause premature failure of the connection.

As shown in FIG. 2, the support surface 20 of the seat 12 is curved about one or more axes to present a complex profile adapted to comfortably accommodate the seat and thighs of a user. For example, the surface can be generally saddle shaped, presenting a central depression curved about an axis disposed above the seat and parallel to a fore-to-aft axis of the seat. The support surface can include side walls 24 that curl upward from the depression along the side edges of the seat. Alternately, or in addition thereto, the front edge of the seat can be turned downward to form a "waterfall" front edge, and the back edge can be turned upward to define the back wall 26.

Figure 7:
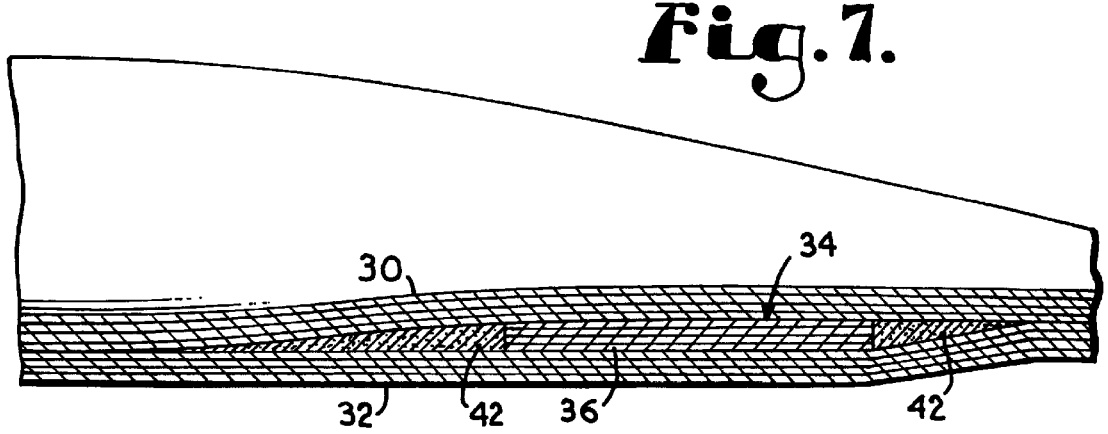
FIG. 7 is a sectional view of the seat taken along line 7—7 of FIG. 2.

As shown in FIG. 7, the seat is constructed of laminated veneer sheets 30, 32 and an intermediate element 34 that is interposed between the sheets 30, 32 during manufacture to enable the provision of the planer central region of the mounting surface. The sheets 30, 32 are preferably poplar veneer, gum veneer, sycamore veneer or the like, and the number and thickness of the sheets used in the seat depends on the desired thickness of the seat. In an exemplary embodiment, eight veneer sheets are employed in the seat, each including a thickness of about 1/16 of an inch such that the resulting seat has a thickness of about 1/2 of an inch. The intermediate element 34 is illustrated as including a plurality of wood veneer sheets 36, e.g. four sheets, that are laminated with the remaining sheets 30, 32 to form the seat. The sheets 36 are selected from same group of veneers available for use in the outer sheets.

The intermediate element 34 functions to fill the volume or space within the seat that must be occupied in order to permit the seat to be formed with both the planer central region in the mounting surface and the opposed curved support surface. In addition, the element 34 strengthens the seat by adding thickness in the region of mounting. Preferably, the sheets 36 of the intermediate element 34 generally correspond in size to the size of the planer central region of the mounting surface. However, it is possible to vary the size of the sheets 36 such that a lowermost sheet of the intermediate element presents a bearing surface that corresponds in size to the planer central area of the mounting surface, and the remaining sheets of the element are successively larger.

Figure 4:
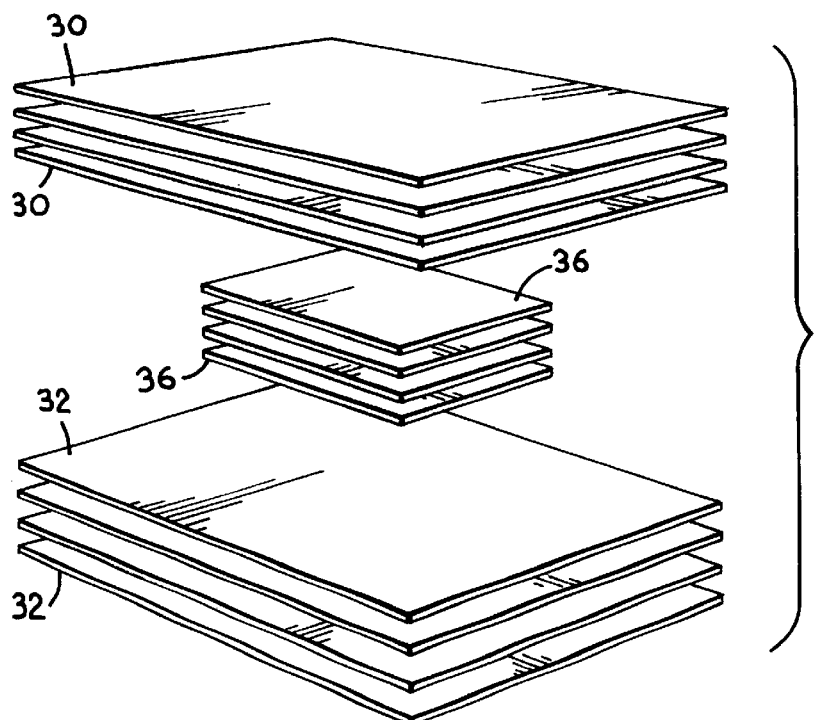
FIG. 4 is an exploded perspective view of a plurality of wood veneer sheets that are piled and pressed to form the seat.
Figure 6:
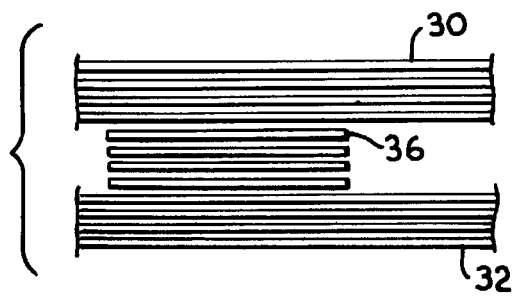
FIG. 6 is a side elevational view of the pile of wood veneer sheets used in the formation of the seat.

With reference to FIG. 4, the seat 12 is constructed by first cutting the veneer sheets 30, 32, 36 to the desired sizes and arranging the sheets in a pile, as shown in FIG. 6. At the time of forming the pile, a suitable adhesive material is applied between the sheets, and other conventional steps may be performed to prepare the pile for molding. As shown in FIG. 6, the sheets 36 of the intermediate element are positioned in the pile in vertical alignment with the desired planer central region of the mounting surface so substantial shifting of the element during molding is not required.

Figure 5:
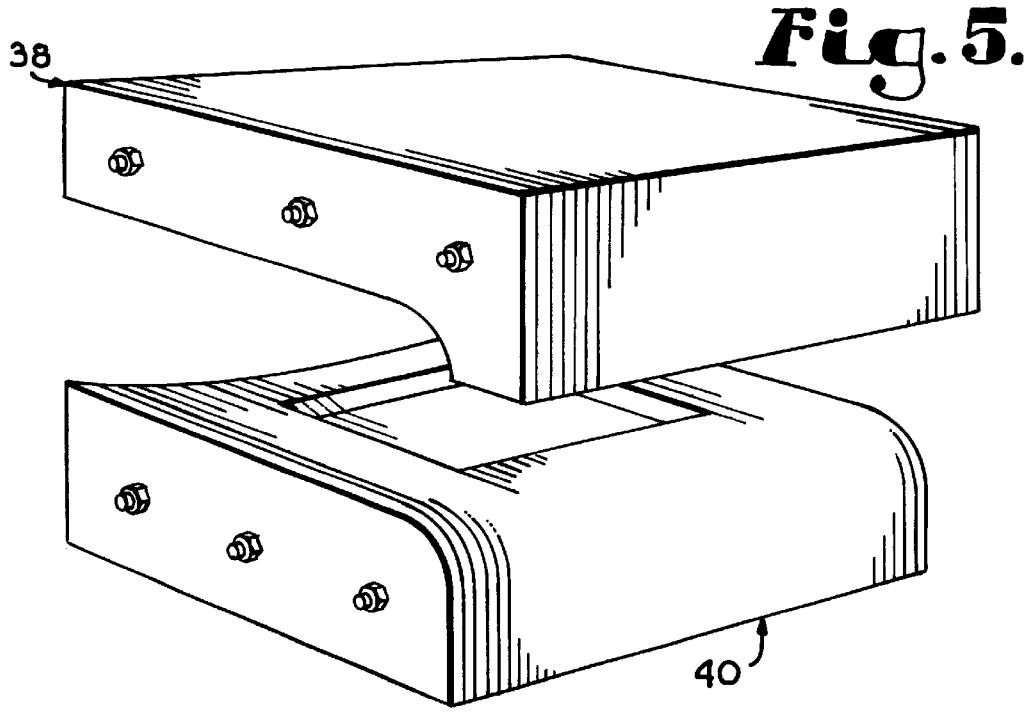
FIG. 5 is a perspective view of a mold used to form the seat.

The pile is then placed in a mold presenting a pair of opposed pressing surfaces. An exemplary mold is illustrated in FIG. 5, and includes first and second mold elements 38, 40, one 40 of which presents a pressing surface that forms the mounting surface of the seat, and the other 38 of which presents a pressing surface that forms the support surface of the seat. The mold elements 38, 40 can be formed of a plurality of pieces of plywood that are secured together by elongated threaded fasteners isolated from the plywood by fiberglass tubing or the like. The pressing surfaces are defined by the edges of the plywood, which can be worked in a conventional fashion to present the desired shape.

The pile is compressed between the pressing surfaces of the mold at a pressure and for a length of time sufficient to permit the adhesive to at least partially set so that the seat can be removed without losing its molded shape. As shown in FIG. 7, as the pile is compressed, the upper and lower sheets 30, 32 are pressed together around the perimeter of the intermediate element 34, and adhesive material 42 is forced into the empty volume between the edges of the intermediate sheets 36 and the outer sheets 30, 32. Thus, the entire volume of the seat is substantially filled, either by the sheets 30, 32, 36 or by the adhesive material 42 used in the construction.

Once molding is complete, the seat 12 is allowed to dry further, and can be finished by conventional wood-working techniques. Once completed, the seat is fit with a cushion and upholstery, and is ready for mounting on the control mechanism of a chair.

Although the present invention has been described with reference to the preferred embodiment illustrated in the attached drawing figures, it is noted that substitutions may be made and equivalents employed herein without departing from the scope of the invention. For example, although the invention has been described with reference to a chair seat, it is noted that the principles of the invention may also be used to form other stock such as backrests and armrests.

In addition, although the intermediate element 34 is illustrated as including a pile of wood veneer sheets 36 stacked in a pile along with the remaining sheets 30, 32 for molding, it is understood that other constructions of the intermediate element are possible. For example, the element may be formed of any desired material, such as a synthetic resin material, and may take any desired shape that facilitates forming the seat with mounting and support surfaces of desired shapes. With reference to FIG. 7, the element could be shaped to fill the volume occupied by the adhesive, reducing the amount of free volume in the seat and further improving the strength and durability of the seat. This can be accomplished either by forming the element of sheets of varying size, with smaller sheets being disposed adjacent the lower sheets 32 of the pile and successively larger sheets on top. Or, a single element can be formed of a shape corresponding to the void shape in the seat between the outer sheets 30, 32 such that the element is positioned between the sheets and molded with the pile to form the stock.

What is claimed is:

1. A wood veneer stock for use in a chair, comprising:

a first wood veneer sheet presenting a mounting surface including a substantially planer central region;

a second wood veneer sheet presenting a support surface including a curved central region immediately opposite the planer region of the mounting surface; and at least one intermediate wood veneer sheet interposed between the central regions of the first and second sheets, the intermediate sheet corresponding in plan size to the planer central region of the mounting surface.

2. The wood veneer stock as recited in claim 1, further comprising an adhesive composition intermediate the sheets.

3. The wood veneer stock as recited in claim 1, wherein the intermediate wood veneer sheet and the central region of the mounting surface are generally rectangular in plan shape.

4. The wood veneer stock as recited in claim 1, wherein the stock is a chair seat.

5. A chair stock for use in a chair, comprising:

a first wood veneer sheet presenting a mounting surface including a substantially planer central region;

a second wood veneer sheet presenting a support surface including a curved central region immediately opposite the planer region of the mounting surface; and at least one intermediate element interposed between the sheets and aligned with the central regions of the mounting and support surfaces, the intermediate element presenting a generally planer bearing surface corresponding in size to the planer central region of the mounting surface.

6. The chair stock as recited in claim 5, wherein the intermediate element is wood.

7. The chair stock as recited in claim 5, wherein the intermediate element includes a pile of wood veneer sheets.

8. The chair stock as recited in claim 5, further comprising an adhesive composition applied between the sheets and the intermediate element for securing the sheets and the intermediate element together.

9. The chair stock as recited in claim 5, wherein the intermediate element and the central region of the mounting surface are generally rectangular in plan shape.

10. The chair stock as recited in claim 5, wherein the stock is a chair seat.

11. A method of making a stock for use in a chair, comprising the steps of:

forming a pile of at least a first wood veneer sheet presenting a mounting surface, a second wood veneer sheet presenting a support surface, and an intermediate element interposed between the first and second sheets, the intermediate element including a planer bearing surface of a size smaller than the mounting and support surfaces;

pressing the pile between first and second spaced apart pressing surfaces, wherein the first pressing surface engages the mounting surface of the pile and includes a substantially planer central region aligned with and corresponding in size to the planer bearing surface of the intermediate element, and the second pressing surface engages the support surface and includes a curved central region immediately opposite the planer central region of the first pressing surface.

12. The method as recited in claim 11, wherein the intermediate element is wood.

13. The method as recited in claim 11, further comprising the step of forming the intermediate element of a pile of wood veneer sheets.

14. The method as recited in claim 11, further comprising the step of applying an adhesive composition between the sheets and the intermediate element prior to the forming step.

15. The method as recited in claim 11, wherein the intermediate element and the central region of the mounting surface are generally rectangular in plan shape.

* * * * *